(12) United States Patent
Koide

(10) Patent No.: US 12,046,806 B2
(45) Date of Patent: Jul. 23, 2024

(54) IN-VEHICLE WIRELESS SYSTEM

(71) Applicant: DENSO CORPORATION, Kariya (JP)

(72) Inventor: Shiro Koide, Kariya (JP)

(73) Assignee: DENSO CORPORATION, Kariya (JP)

( * ) Notice: Subject to any disclaimer, the term of this patent is extended or adjusted under 35 U.S.C. 154(b) by 742 days.

(21) Appl. No.: 17/110,209

(22) Filed: Dec. 2, 2020

(65) Prior Publication Data

US 2021/0083371 A1    Mar. 18, 2021

Related U.S. Application Data

(63) Continuation of application No. PCT/JP2019/016246, filed on Apr. 16, 2019.

(30) Foreign Application Priority Data

Jun. 12, 2018   (JP) ................................. 2018-112069

(51) Int. Cl.
| | | |
|---|---|---|
| H01Q 1/32 | (2006.01) | |
| H01Q 21/28 | (2006.01) | |
| H01Q 23/00 | (2006.01) | |
| H04W 4/40 | (2018.01) | |
| H04W 4/80 | (2018.01) | |

(52) U.S. Cl.
CPC ......... *H01Q 1/3275* (2013.01); *H01Q 1/3291* (2013.01); *H01Q 21/28* (2013.01); *H01Q 23/00* (2013.01); *H04W 4/40* (2018.02); *H04W 4/80* (2018.02)

(58) Field of Classification Search
CPC .. H04W 84/005; H04W 88/04; H01Q 1/3275; H01Q 1/3291; H01Q 1/42

USPC ........................................................ 343/713
See application file for complete search history.

(56) References Cited

U.S. PATENT DOCUMENTS

| | | | |
|---|---|---|---|
| 9,045,102 B2* | 6/2015 | Caratto | B60R 25/00 |
| 9,571,172 B2* | 2/2017 | Song | H01Q 21/28 |
| 2007/0279304 A1 | 12/2007 | Chakam et al. | |
| 2013/0076577 A1* | 3/2013 | Chakam | H01Q 1/42 343/713 |
| 2015/0097738 A1 | 4/2015 | Sugimoto et al. | |
| 2016/0013839 A1 | 1/2016 | Song et al. | |
| 2017/0054204 A1 | 2/2017 | Changalvala et al. | |
| 2018/0166774 A1* | 6/2018 | Gondara | H01Q 1/3283 |
| 2020/0350943 A1 | 11/2020 | Zhan et al. | |

FOREIGN PATENT DOCUMENTS

| | | |
|---|---|---|
| CN | 105262522 A | 1/2016 |
| DE | 102006025176 A1 | 12/2007 |
| DE | 102015111310 A1 | 1/2016 |

(Continued)

*Primary Examiner* — Hoang V Nguyen
*Assistant Examiner* — Brandon Sean Woods
(74) *Attorney, Agent, or Firm* — Harness, Dickey & Pierce, P.L.C.

(57) ABSTRACT

An in-vehicle wireless system includes: multiple antennas; and multiple antenna housings that house the multiple antennas and are smaller in number than the multiple antennas. The multiple antenna housings include a vehicle interior antenna housing placed in a vehicle interior of a vehicle. The vehicle interior antenna housing houses an antenna for performing communication by connecting to a mobile communication line that is a public communication line that is connectable to a mobile wireless device.

12 Claims, 2 Drawing Sheets

(56) References Cited

FOREIGN PATENT DOCUMENTS

| | | | |
|---|---|---|---|
| EP | 1903632 B1 | 1/2011 | |
| EP | 2501200 A1 * | 9/2012 | .......... H04W 84/005 |
| JP | 5874780 B2 | 3/2016 | |
| WO | WO-2017215634 A1 | 12/2017 | |

* cited by examiner

FIG. 3

| PATTERN | ROOFTOP ANTENNA HOUSING | | | | | VEHICLE INTERIOR ANTENNA HOUSING | | |
|---|---|---|---|---|---|---|---|---|
| 1 | V2X | GNSS | | | | TEL | | |
| 2 | V2X | GNSS | RKE | SXM | | TEL | WLAN | |
| 3 | V2X | GNSS | RKE | SXM | TEL−Sub | TEL | WLAN | V2X−Sub |

IN-VEHICLE WIRELESS SYSTEM

CROSS REFERENCE TO RELATED APPLICATIONS

The present application is a continuation application of International Patent Application No. PCT/JP2019/016246 filed on Apr, 16, 2019, which designated the U.S. and claims the benefit of priority from Japanese Patent Application No. 2018-112069 filed on Jun. 12, 2018. The entire disclosures of all of the above applications are incorporated herein by reference.

TECHNICAL FIELD

The present disclosure relates to an in-vehicle wireless system, particularly, an in-vehicle wireless system including multiple antennas.

BACKGROUND

An in-vehicle wireless system including various kinds of antennas for performing communication in various kinds of communication methods has been known. An antenna module in which all of the antennas are housed in one housing has been proposed.

SUMMARY

An in-vehicle wireless system may include: multiple antennas; and multiple antenna housings that may house the multiple antennas and be smaller in number than the multiple antennas. The multiple antenna housings may include a vehicle interior antenna housing placed in a vehicle interior of a vehicle. The vehicle interior antenna housing may house an antenna for performing communication by connecting to a mobile communication line that is a public communication line that is connectable to a mobile wireless device.

BRIEF DESCRIPTION OF DRAWINGS

The above and other features and advantages of the present disclosure will be more clearly understood from the following detailed description with reference to the accompanying drawings. In the accompanying drawings.

FIG. 3 is a diagram showing hosing patterns of various antennas.

DETAILED DESCRIPTION

Figure 1:
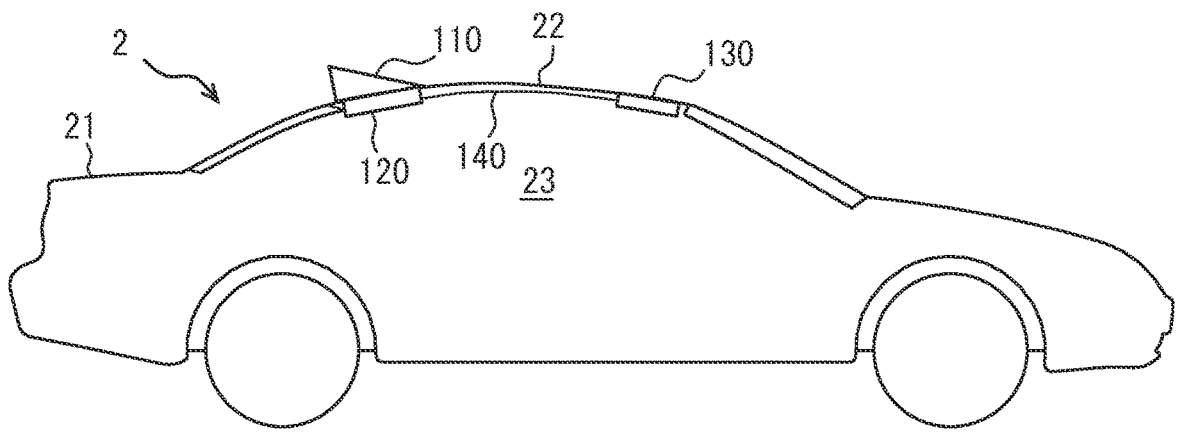
FIG. 1 is a view showing an arrangement of an in-vehicle wireless system.

When all of multiple antennas for performing multiple kinds of communications are housed in one housing, the size of the housing increases. When the size of the housing increases, a place where the housing can be mounted in the vehicle is limited. In addition, the designability may be deteriorated.

In order to suppress one housing from being large, multiple housing may be prepared, and multiple antennas may be separately housed in the multiple housings. However, as the housings increases in number, the man-hours for mounting the housings on the vehicle may increase in number. A wireless communication performance may deteriorate depending on an arrangement place of the housing.

Further, standards of various communication methods may be changed, and it may be necessary to replace a component for using the communications methods after the standards are changed. The component replacement work is desired to be easy.

One example of the present disclosure provides an in-vehicle wireless system capable of suppressing a decrease in wireless communication performance while suppressing an increase in the size of a housing. Another example of the present disclosure provides an in-vehicle wireless system capable of easily replacing a component that is necessary to be replaced.

According to one example embodiment, an in-vehicle wireless system includes multiple antennas and multiple antenna housings that house the multiple antennas and are smaller in number than the antennas. In the in-vehicle wireless system, the antenna housings include a rooftop antenna housing placed on a roof of a vehicle and a vehicle interior antenna housing placed in a vehicle interior of the vehicle. The rooftop antenna housing at least two types of antennas corresponding to an antenna for performing communication requiring an isotropic directivity in a horizontal plane or an antenna that is necessary to receive electric waves from above the vehicle. The vehicle interior antenna housing houses an antenna for performing communication by connecting to a mobile communication line that is a public communication line that is connectable to a mobile wireless device.

It may be possible to suppress an increase in the size of each of the housings as compared with a case where all of the antennas are housed in one housing since the multiple housings are included for housing the antennas. It may be possible to suppress an increase in the man-hours for mounting the housing on the vehicle since the antenna housings are less in number than the antennas. Since one antenna housing is a roof antenna housing and the rooftop antenna housing houses at least two types of antennas corresponding to an antenna for communication that requires an isotropic directivity in a horizontal plane or an antenna that requires to receive electric waves from above the vehicle, it may be possible to suppress a decrease in the wireless communication as compared with a case where these antennas are placed at positions different from a position on the roof.

According to another example embodiment, an in-vehicle wireless system includes multiple antennas and multiple antenna housings that house the multiple antennas and are smaller in number than the antennas. One of the antenna housings is a vehicle interior antenna housing placed in a vehicle interior of the vehicle. The vehicle interior antenna housing houses an antenna and a wireless circuit for performing communication by connecting to a mobile communication line that is a public communication line that is connectable to a mobile wireless device.

It may be possible to suppress an increase in the size of each of the housings as compared with a case where all of the antennas are housed in one housing since the multiple housings are included for housing the antennas. Since the housings are less in number than the antennas, it may be possible to suppress an increase in the man-hours for mounting the housings at the vehicle.

Further, one housing is set to a vehicle interior antenna housing. The vehicle interior antenna housing houses an antenna for performing communication by connecting to a mobile communication line and a wireless circuit. A communication performance in a case where the antenna is housed in the vehicle interior antenna housing is lower than a communication performance in a case where the antenna is outside the vehicle. However, as for the mobile communication circuit, a base station is provided in assumption that various electric wave shields are placed around the mobile wireless device. Accordingly, even when the antenna for performing the communication by connecting to the mobile communication line is housed in the vehicle interior antenna housing, the communication performance does not significantly decrease.

Further, since the vehicle interior antenna housing is used, that is, the housing is placed in the vehicle interior, it becomes easy to replace the component inside the housing. Standards for the component for the mobile communication line is changed faster than standards for a component for communication only for a vehicle. Therefore, there is a high possibility that it becomes necessary to replace the component for performing the communication by connecting to the mobile communication line as compared with the component for the communication only for the vehicle. Accordingly, the antenna for performing the communication by connecting to the mobile communication line and the wireless circuit are housed in the vehicle interior antenna housing, and thereby there is the high possibility that it may be possible to easily replace the component being necessary to be replaced.

Hereinafter, embodiments will be described with reference to the drawings. FIG. 1 is a view showing an arrangement in a vehicle 2 of an in-vehicle wireless system 100 according to the embodiment. The in-vehicle wireless system 100 is mounted on the vehicle 2, and includes a rooftop antenna housing 110, a vehicle interior antenna housing 130, and a wireless circuit housing 120 that are antenna housings.

The vehicle 2 shown in FIG. 1 is a sedan type, and includes a trunk 21. A body of the vehicle 2 includes the trunk 21 and a roof 22, and is made of metal.

A rear end part of the roof 22 of the vehicle 2 is gently inclined. A height position of an upper surface of the rear end portion of the roof 22 becomes lower as the position approaches the rear of the vehicle 2. However, the vehicle 2 on which the in-vehicle wireless system 100 is mounted is not limited to the vehicle 2 having the roof shape shown in FIG. 1. The in-vehicle wireless system 100 may be mounted on a vehicle whose roof has a substantially flat outer surface. The in-vehicle wireless system 100 can be mounted on vehicles having various outer shapes. For example, the in-vehicle wireless system 100 can be mounted on a box type vehicle. Although the vehicle 2 shown in FIG. 1 is a normal passenger car, the in-vehicle wireless system 100 can be mounted on vehicles of various categories. For example, the in-vehicle wireless system 100 can be mounted on a truck.

The rooftop antenna housing 110 is arranged at the rear end portion of the upper surface of the roof 22 in the vehicle 2. The rooftop antenna housing 110 and the vehicle interior antenna housing 130 are made of resin so as not to block the electric waves. In a vehicle interior 23, the wireless circuit housing 120 is arranged at a position facing the rooftop antenna housing 110. The roof 22 is arranged between the wireless circuit housing 120 and the rooftop antenna housing 110. The vehicle interior antenna housing 130 is arranged at the front portion of the roof 22 in the vehicle interior 23. The wireless circuit housing 120 and the vehicle interior antenna housing 130 are connected to each other by a communication line 140. The front portion may be an installation position of an overhead console. The front end may be positioned on the front side of the roof 22 in a vehicle traveling direction.

(Configurations of Housings)
(Configuration of Rooftop Antenna Housing)

Figure 2:
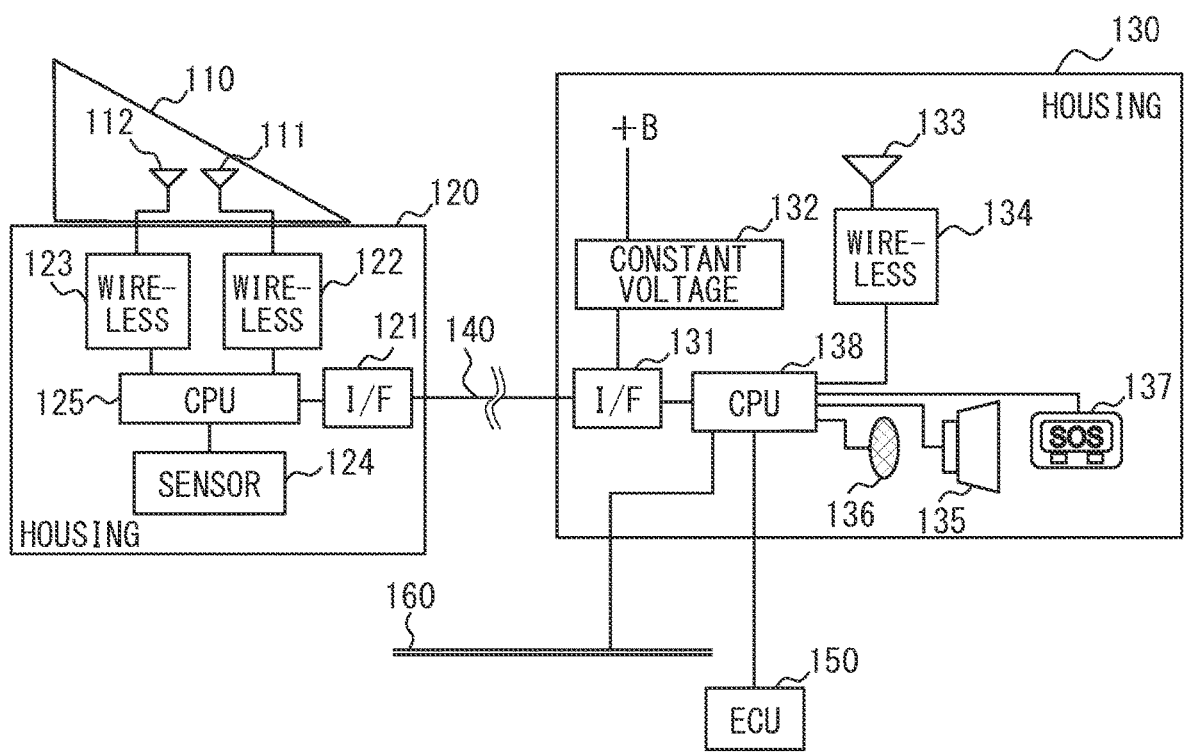
FIG. 2 is a diagram showing a configuration inside each housing of the in-vehicle wireless system.

Next, a configuration in each housing will be described with reference to FIG. 2. First, a configuration housed inside the rooftop antenna housing 110 will be described. The rooftop antenna housing 110 houses a V2X antenna 111 and a GNSS antenna 112. The V2X is an abbreviation for Vehicle-to-everything.

The V2X antenna 111 is an antenna for a vehicle near field communication. The communication partner of this communication is a wireless device mounted on a different vehicle, a wireless device installed at a roadside machine, or the like. The communication partner may be a pedestrian. When the communication partner is the wireless mounted on the different vehicle, the communication is a vehicle to vehicle communication. When the communication partner is the wireless device installed at the roadside machine, the communication is a road to vehicle communication. The communication using the V2X antenna 111 will be hereinafter referred to as a V2X communication.

A frequency used in the V2X communication differs depending on the country or the region. For example, the 5.9 GHz band or the 700 MHz band is used. The communication distance of the V2X communication is generally several hundred meters.

It is not known that the communication partner in the V2X communication exists in which direction of 360 degrees around the vehicle 2 on which this in-vehicle wireless system 100 is mounted. Accordingly, the V2X antenna 111 needs to be able to communicate with the communication partner existing in any direction in a horizontal plane within a communication distance. Therefore, the V2X communication is a communication that requires an isotropic directivity in a horizontal plane.

The GNSS antenna 112 is an antenna that receives a navigation signal transmitted from a navigation satellite of a GNSS, that is, an antenna for the navigation signal. Since the navigation satellite exists in the sky, the GNSS antenna 112 is an antenna that needs to receive the electric waves from above the vehicle. The GNSS is an abbreviation for Global Navigation Satellite System.

In the rooftop antenna housing 110, the V2X antenna 111, the GNSS antenna 112, and a substrate for fixing the V2X antenna 111 and the GNSS antenna 112 are placed. Further, a ground, an amplifier amplifying a signal, or the like may be placed.

(Configuration of Wireless Circuit Housing)

Next, an internal configuration of the wireless circuit housing 120 will be described. The wireless circuit housing 120 houses an interface portion (hereinafter, an I/F portion) 121, two wireless circuits 122 and 123, a gyro sensor 124, and a CPU 125.

The I/F portion 121 is connected to the communication line 140 for performing the communication in accordance with the predetermined communication standard and the CPU 125. This communication line 140 has a function as an electric power supply line in addition to a function of transmitting the signal. The electric power supplied by the communication line 140 is supplied to an electric component in the wireless circuit housing 120 such as the CPU 125 via the I/F portion 121.

The wireless circuit 122 is connected to the V2X antenna 111 by a signal line such as a coaxial cable. The wireless circuit 122 is controlled by the CPU 125 and performs amplification of the signal, modulation, demodulation, or the like.

The wireless circuit 123 is connected to the GNSS antenna 112 by the signal line, is controlled by the CPU 125, and performs amplification of the signal, demodulation, or the like.

The gyro sensor 124 detects a rotation angular velocity around a vertical axis of the vehicle 2, and outputs the detected rotation angular velocity to the CPU 125.

The CPU 125 communicates with a CPU 138 housed in the vehicle interior antenna housing 130 via the I/F portion 121, the communication line 140, and an I/F portion 131. This CPU 125 controls the wireless circuits 122 and 123. The CPU 125 calculates a current position based on the navigation signal received by the GNSS antenna 112. In addition to the CPU 125, a circuit that calculates the current position based on the navigation signal may be placed in the rooftop antenna housing 110. The signal transmitted from the CPU 125 to the CPU 138 housed in the vehicle interior antenna housing 130 is a rotation angular velocity detected by the gyro sensor 124, the current position, the vehicle-to-vehicle communication signal received by the V2X antenna 111, or the like.

(Configuration of Vehicle Interior Antenna Housing)

The vehicle interior antenna housing 130 houses the I/F portion 131, a constant voltage circuit 132, a telephone antenna 133, a wireless circuit 134, a speaker 135, a microphone 136, a display portion 137, and a CPU 138.

The I/F portion 131 is an interface connected to the communication line 140. The I/F portion 131 is connected to the CPU 138 or the like in addition to the communication line 140. The constant voltage circuit 132 converts a vehicle power source +B into a voltage at which electronic components housed in the vehicle interior antenna housing 130 and the wireless circuit housing 120 can operate. The electronic component is the wireless circuit 122, 123, 134, the CPU 125, 138, or the like. For example, the constant voltage circuit 132 converts 12V into 5V. The voltage converted by the constant voltage circuit 132 is supplied to the electronic component housed in the vehicle interior antenna housing 130. Furthermore, the voltage is transmitted by the communication line 140, and is supplied to the electronic component housed in the wireless circuit housing 120 The wireless circuits 122 and 123 may be also referred to as a first wireless circuit. The wireless circuit 134 may be also referred to as a second wireless circuit.

The telephone antenna 133 is an antenna used when performing communication by connecting to a public communication line (hereinafter, mobile communication line) to which a mobile phone as the mobile wireless device is connected. The wireless circuit 134 is connected to the telephone antenna 133. When the wireless circuit 134 is controlled by the CPU 138 and performs the communication by connecting to the mobile communication line, the wireless circuit 134 performs the amplification of the signal, the modulation, and the demodulation.

The speaker 135 and the microphone 136 are used when a driver of the vehicle 2 makes a call via the mobile communication line. The vehicle 2 has an emergency notification function. When emergency notification is performed, the call via the mobile communication line is performed with use of the speaker 135 and the microphone 136. When the emergency notification is performed, the display portion 137 displays that the emergency notification is being performed.

The CPU 138 communicates with the CPU 125 housed in the wireless circuit housing 120 via the I/F portion 131, the communication line 140, and the I/F portion 121. By communicating with the CPU 125, the CPU 138 acquires the current position of the vehicle 2, the signal of the vehicle-to-vehicle communication, or the like.

This CPU 138 controls the wireless circuit 134. A process executed by the CPU 138 controlling the wireless circuit 134 is an emergency notification process. In the emergency notification process, the CPU 138 controls the wireless circuit 134, receives or transmits the electric waves by using the telephone antenna 133, and automatically connects to an external center device. The CPU 138 communicates with the center device. In this communication, the CPU 138 modulates a voice input from the microphone 136 by using the wireless circuit 134 and transmits the voice to the center device. The CPU 138 demodulates an operator voice transmitted from the center device by using the wireless circuit 134 and causes the speaker 135 to output the voice. When executing the emergency notification process, the CPU 138 causes the display portion 137 to display that the emergency notification process is being executed.

The CPU 138 is connected to a central ECU 150 and an vehicle interior LAN 160. The central ECU 150 is an ECU connected to various ECUs such as a body type control ECU, a cockpit system ECU, or an automatic driving system ECU. The CPU 138 outputs various information acquired by controlling the wireless circuits 122, 123, and 134 to the central ECU 150.

The central ECU 150 outputs the acquired information to the ECU determined in accordance with the type of the information. The data to be wirelessly transmitted to the outside is supplied from the central ECU 150 to the CPU 138. The CPU 138 outputs the data to the wireless circuit determined in accordance with the type of the data, and performs wireless transmission to the outside.

The CPU 138 can output various signals to various instrument inside the vehicle via a vehicle interior LAN 160. The CPU 138 and the central ECU 150 may be connected via the vehicle interior LAN 160.

According to this first embodiment, the in-vehicle wireless system 100 includes two antenna housings of the rooftop antenna housing 110 and the vehicle interior antenna housing 130. Three types of antennas 111, 112, and 133 are distributed to and arranged in these two antenna housings. Accordingly, it may be possible to reduce the size of one antenna housing as compare with a case where all of the antennas are housed in on antenna housing.

It may be possible to suppress an increase in the number of man-hours for mounting the housing on the vehicle 2 since the antenna housings are less in number than the antennas. The rooftop antenna housing 110 houses the V2X antenna 111 used for the V2X communication that is the communication requiring the isotropic directivity in the horizontal plane and the GNSS antenna 112 that is necessary to receive the electric waves from above the vehicle. Thereby, it may be possible to suppress the decrease in the wireless communication performance as compared with the case where the V2X antenna 111 and the GNSS antenna 112 are arranged at the positions different from the positions on the roof.

In the in-vehicle wireless system 100, the vehicle interior antenna housing 130 houses the telephone antenna 133 for performing the communication by connecting to the mobile communication line and the wireless circuit 134. A communication performance in a case where the telephone antenna 133 is housed in the vehicle interior antenna housing 130 is lower than a communication performance in a case where the telephone antenna 133 is outside the vehicle. However, as for the mobile communication circuit, a base station is provided in assumption that various electric wave shields are placed around the mobile phone. Accordingly, even when the telephone antenna 133 is housed in the vehicle interior antenna housing 130, the communication performance is not significantly decreased.

Since the vehicle interior antenna housing 130 is arranged in the vehicle interior 23, it becomes easier to replace the component in the housing as compared with the case where the vehicle interior antenna housing 130 is placed in the vehicle interior 23. The standard for the component for the mobile communication line is changed faster than standard for a component for communication only for a vehicle such as the V2X communication. Therefore, there is a high possibility that it becomes more necessary to replace the component for performing the communication by connecting to the mobile communication line as compared with the component for the communication only for the vehicle. Accordingly, the telephone antenna 133 for performing the communication by connecting to the mobile communication line and the wireless circuit 134 are housed in the vehicle interior antenna housing 130, and thereby there is a high possibility that it may be possible to easily replace the component being necessary to be replaced.

Since the vehicle interior antenna housing 130 is arranged at the front end portion of the roof 22 in the vehicle interior 23, the electric wave shielding by the roof 22 is little as compared with the case where the vehicle interior antenna housing 130 is arranged at the central portion of the roof 22 in the vehicle interior 23. Accordingly, the decrease in the communication performance is suppressed.

In the in-vehicle wireless system 100, the vehicle interior antenna housing 130 houses the constant voltage circuit 132. The voltage converted by the constant voltage circuit 132 is supplied to the electronic components such as the wireless circuits 122 and 123 housed in the wireless circuit housing 120 via the communication line 140. Thereby, the constant voltage circuit 132 of which volume is generally large becomes unnecessary to be arranged in the wireless circuit housing 120 of which size is difficult to increase as compared with that of the vehicle interior antenna housing 130.

Other Embodiments

Next, as other embodiments, other examples of the housing pattern of the antenna will be described. Any element mentioned in the following description and denoted by the reference sign referred to earlier is identical with the element denoted by the identical reference sign in the preceding embodiment, unless otherwise specified. When only a part of the configuration is described, the embodiment described above can be applied to other parts of the configuration.

FIG. 3 shows housing patterns of various antennas. A pattern 1 shows a housing pattern of the antennas according the first embodiment described above. In FIG. 3, the TEL means the telephone antenna 133.

Second Embodiment

In a second embodiment, antennas shown in a pattern 2 of FIG. 3 are housed in each of the rooftop antenna housing 110 and the vehicle interior antenna housing 130.

In the pattern 2, the rooftop antenna housing 110 houses a RKE antenna and a SXM antenna, in addition to the V2X antenna 111 and the GNSS antenna 112.

The RKE antenna is an antenna used for a remote keyless entry system. In the remote keyless entry system, communication is performed between an antenna housed in an electronic key carried by a use and the RKE antenna. The user carrying the electronic key does not know which direction of 360 degrees around the vehicle 2 the user exists in. Accordingly, the RKE antenna requires the isotropic directivity in the horizontal plane. The remote keyless entry system is the communication that requires the isotropic directivity in the horizontal plane.

The SXM antenna is an antenna for receiving a sirius XM radio. The sirius XM radio is based on a satellite broadcasting. However, in some areas, the electric waves are transmitted from relay stations on the ground. A direction in which the relay station exists with respect to the vehicle 2 changes depending on the position of the vehicle 2. Therefore, a horizontal direction gain of a wireless device for receiving the sirius XM radio is specified. In other words, the wireless device for receiving the sirius XM radio requires the isotropic directivity in the horizontal plane.

In the pattern 2, the vehicle interior antenna housing 130 houses a WLAN antenna in addition to the telephone antenna 133. The WLAN antenna is an antenna for performing the communication by connecting to a public wireless LAN formed around the road. The mobile wireless device such as a smartphone can be connected to the public wireless LAN. The public wireless LAN is also the mobile communication line.

The types of the antennas in this pattern 2 is larger in number than that in the pattern 1. However, similarly to the pattern 1, the antennas housed in the rooftop antenna housing 110 are the antennas that are used for the communication requiring the isotropic directivity in the horizontal plane and the antenna that is necessary to receive the electric waves from above the vehicle. The antennas housed in the vehicle interior antenna housing 130 are, similarly to the pattern 1, the antennas for performing the communication by connecting to the mobile communication line.

Third Embodiment

In a third embodiment, antennas shown in a pattern 3 of FIG. 3 are housed in each of the rooftop antenna housing 110 and the vehicle interior antenna housing 130.

In the pattern 3, the rooftop antenna housing 110 houses a TEL sub antenna, in addition to the V2X antenna 111, the GNSS antenna 112, the RKE antenna, and the SXM antenna. The TEL sub antenna is an antenna used with the telephone antenna 133 for performing communication in a MIMO method. The MIMO is an abbreviation for Multiple-Input and Multiple-Output.

In the pattern 2, the vehicle interior antenna housing 130 houses a V2X sub antenna in addition to the telephone antenna 133 and the WLAN antenna. The V2X sub antenna and the V2X antenna have the same function.

As shown in this third embodiment, the antennas housed in the rooftop antenna housing 110 are not limited to the antennas that are used for the communication requiring the isotropic directivity in the horizontal plane and the antennas that are necessary to receive the electric waves from above the vehicle. The antennas housed in the vehicle interior antenna housing 130 are not limited to the antennas for performing the communication by connecting to the mobile communication line.

In the third embodiment, each of the rooftop antenna housing 110 and the vehicle interior antenna housing 130 houses the telephone antenna, and the communication of the MIMO method is performed. As compared with a case where one housing houses all of the multiple antennas used in the MIMO method, it may be possible to increase a distance between the multiple antennas used in the MIMO method. Therefore, the communication performance in the MIMO method is improved.

In the third embodiment, each of the rooftop antenna housing 110 and the vehicle interior antenna housing 130 houses the V2X antenna, and the communication is performed. In the roof 22 of the vehicle 2 shown in FIG. 1, a portion on which the rooftop antenna housing 110 is placed is gently inclined. Therefore, the V2X antenna 111 housed in the rooftop antenna housing 110 may have an insufficient radiation characteristic at a low elevation angle in front of the vehicle. However, int this third embodiment, the vehicle interior antenna housing 130 houses the V2X sub antenna. Accordingly, even when the portion on which the rooftop antenna housing 110 is placed in the roof 22 of the vehicle 2 is inclined, it may be possible to suppress the decrease in the communication performance for the front of the vehicle in the V2X communication.

(First Modification)

The rooftop antenna housing 110 may not be necessarily placed at the rear end portion of the roof 22, and may be placed at a different portion on the roof 22, for example, a center of the roof 22. The vehicle interior antenna housing 130 may be also placed at a different position in the vehicle interior 23.

(Second Modification)

In the first embodiment, the wireless circuit housing 120 is provided separately from the rooftop antenna housing 110. However, all of the components housed in the wireless circuit housing 120 may be housed in the rooftop antenna housing 110, and the wireless circuit housing 120 may not be provided.

(Third Modification)

The antennas housed in the rooftop antenna housing 110 and the vehicle interior antenna housing 130 are not limited to the antennas shown in FIG. 3. Various antennas may be housed in any of the rooftop antenna housing 110 and the vehicle interior antenna housing 130.

Examples of other antennas include a BLE antenna, an AM antenna, a FM antenna, a DAB antenna, and the like. The Bluetooth is a registered trade mark. The BLE can be used for the communication between the electronic key and an in-vehicle instrument in the remote keyless entry system. The DAB of the DBA antenna is one of digital radio standards. The BLE is an abbreviation for Bluetooth Low Energy. The DAB is an abbreviation for Digital Audio Broadcast.

It is preferable to house these BLE antenna, the AM antenna, the FM antenna, the DAB antenna in the rooftop antenna housing 110 when there is enough space.

(Fourth Modification)

In the patterns 2 and 3 of FIG. 3, all of the antenna that is used for the communication requiring the isotropic directivity in the horizontal plane and the antenna that is necessary to receive the electric waves from above the vehicle are housed in the rooftop antenna housing 110. However, when two types of antennas among these are housed in the rooftop antenna housing 110, the remaining antenna may be hosed in the vehicle interior antenna housing 130.

(Fifth Modification)

In the patterns 2 and 3, the vehicle interior antenna housing 130 houses the two types of antennas for performing the communication by connecting to the mobile communication line. When only one of these is housed in the vehicle interior antenna housing 130, the other may be housed in the rooftop antenna housing 110.

In the above, the embodiment, the configuration, and the aspect of the in-vehicle wireless system according to the present disclosure are exemplified. However, the present disclosure is not limited to every embodiment, every configuration and every aspect related to the present disclosure that are exemplified. For example, embodiments, configurations, and aspects obtained from an appropriate combination of technical elements disclosed in different embodiments, configurations, and aspects are also included within the scope of the embodiments, configurations, and aspects of the present disclosure.

The invention claimed is:

1. An in-vehicle wireless system comprising:
a plurality of antennas; and
a plurality of antenna housings that house the plurality of antennas and are smaller in number than the plurality of antennas,
wherein:
the plurality of antenna housings include
a rooftop antenna housing placed on a roof of a vehicle and
a vehicle interior antenna housing placed in a vehicle interior of the vehicle;
the rooftop antenna housing houses: an antenna for a vehicle near field communication requiring an isotropic directivity in a horizontal plane; and an antenna that is necessary to receive electric waves from above the vehicle;
the vehicle interior antenna housing houses: a sub antenna for the vehicle near field communication; and an antenna for performing communication by connecting to a mobile communication line that is a public communication line that is connectable to a mobile wireless device;
the rooftop antenna housing is placed on a rear end of the roof;
the vehicle interior antenna housing is placed at a front end of the roof of the vehicle in the vehicle interior; and
the vehicle interior antenna housing placed in the vehicle interior does not face the rooftop antenna housing and does not sandwich the roof with the rooftop antenna housing.

2. The in-vehicle wireless system according to claim 1, wherein:
the vehicle interior antenna housing houses:
a wireless circuit that is connected to an antenna for performing communication by connecting to the mobile communication line and is configured to perform application, modulation or demodulation of a signal;
a microphone for a call via the mobile communication line; and
a speaker for the call via the mobile communication line.

3. The in-vehicle wireless system according to claim 2, wherein:
the wireless circuit
is placed at the rooftop antenna housing or a portion of the vehicle interior, facing the rooftop antenna housing and
is connected to an antenna placed in the rooftop antenna housing, the system further includes a constant voltage circuit that changes a vehicle power source into a voltage at which the wireless circuit is operable in the vehicle interior antenna housing.

4. The in-vehicle wireless system according to claim 1, wherein:
each of the vehicle interior antenna housing and the rooftop antenna housing houses: an antenna for vehicle near field communication; and an antenna for the mobile communication line.

5. The in-vehicle wireless system according to claim 1, wherein:
the rooftop antenna housing houses an antenna for a navigation signal; and
the antenna for the navigation signal is the antenna that is necessary to receive the electric waves from above the vehicle.

6. The in-vehicle wireless system according to claim 1, wherein
a frequency of the antenna for the communication requiring the isotropic directivity in the horizontal plane is 5.9 GHz band or 700 MHz band.

7. The in-vehicle wireless system according to claim 1, wherein
the vehicle interior antenna housing placed in the vehicle interior does not overlap with the rooftop antenna housing.

8. An in-vehicle wireless system comprising:
a plurality of antennas; and
a plurality of antenna housings that house the plurality of antennas and are smaller in number than the plurality of antennas,
wherein:
the plurality of antenna housings include: a vehicle interior antenna housing placed in a vehicle interior of a vehicle; and a rooftop antenna housing placed on a roof of the vehicle;
the vehicle interior antenna housing houses an antenna for a mobile wireless device for performing communication by connecting to a mobile communication line that is a public communication line that is connectable to the mobile wireless device;
the rooftop antenna housing includes: an antenna for communication requiring an isotropic directivity in a horizontal plane; an antenna for receiving electric waves from a satellite; and a sub antenna for connection to the mobile communication line; and
the vehicle interior antenna housing placed in the vehicle interior does not face the rooftop antenna housing and does not sandwich the roof with the rooftop antenna housing.

9. The in-vehicle wireless system according to claim 8, wherein:
the vehicle interior antenna housing is placed at a front end portion of the roof of the vehicle in the vehicle interior.

10. The in-vehicle wireless system according to claim 9, wherein
the rooftop antenna housing is placed on a rear end portion of the roof.

11. An in-vehicle wireless system further comprising:
a plurality of antennas; and
a plurality of antenna housings that house the plurality of antennas and are smaller in number than the plurality of antennas, wherein:
one of the plurality of antenna housings is a vehicle interior antenna housing placed in a vehicle interior of a vehicle;
the vehicle interior antenna housing is placed at a front end of a roof in the vehicle interior, and houses:
a telephone antenna for a mobile wireless device for performing communication by connecting to a mobile communication line that is a public communication line that is connectable to the mobile wireless device;
a wireless circuit that is connected to an antenna for performing communication by connecting to the mobile communication line and is configured to perform application, modulation or demodulation of a signal;
a microphone for a call via the mobile communication line; and
a speaker for the call via the mobile communication line; one of the plurality of antenna housings is a rooftop antenna housing placed on the roof of the vehicle; and
the vehicle interior antenna housing placed in the vehicle interior does not sandwich the roof with the rooftop antenna housing.

12. The in-vehicle wireless system according to claim 11, wherein the rooftop antenna housing is placed on a rear end of the roof of the vehicle and the vehicle interior antenna housing placed in the vehicle interior does not overlap with the rooftop antenna housing.

* * * * *